US007570352B2

(12) United States Patent
Flannigan et al.

(10) Patent No.: US 7,570,352 B2
(45) Date of Patent: Aug. 4, 2009

(54) LASER SCANNING APPARATUS WITH IMPROVED OPTICAL FEATURES

(75) Inventors: William Clay Flannigan, Omaha, NE (US); James Brett Campbell, Grand Island, NE (US)

(73) Assignee: Chief Automotive Technologies, Inc, Grand Island, NE (US)

( * ) Notice: Subject to any disclaimer, the term of this patent is extended or adjusted under 35 U.S.C. 154(b) by 365 days.

(21) Appl. No.: 11/381,002

(22) Filed: May 1, 2006

(65) Prior Publication Data

US 2007/0076193 A1  Apr. 5, 2007

Related U.S. Application Data

(60) Provisional application No. 60/723,731, filed on Oct. 5, 2005.

(51) Int. Cl.
*G01B 11/26* (2006.01)
(52) U.S. Cl. .......................................... 356/155; 356/153
(58) Field of Classification Search .......... 356/153–155
See application file for complete search history.

(56) References Cited

U.S. PATENT DOCUMENTS

| | | | |
|---|---|---|---|
| 3,816,000 | A | 6/1974 | Fiedler |
| 4,015,338 | A | 4/1977 | Kunze |
| 4,513,508 | A | 4/1985 | Jarman |
| D281,977 | S | 12/1985 | Sklaroff |
| 4,564,085 | A | 1/1986 | Melocik |
| D307,894 | S | 5/1990 | Siemiatkowski |
| 4,997,283 | A | 3/1991 | Danielson |
| 5,029,397 | A | 7/1991 | Palombi |
| 5,035,503 | A | 7/1991 | Sadeh |
| D327,878 | S | 7/1992 | Fukutake |
| 5,251,013 | A | 10/1993 | Danielson |
| 5,767,976 | A | 6/1998 | Ankerhold |
| 5,801,834 | A | 9/1998 | Danielson |
| 6,347,457 | B1 | 2/2002 | Espinoza |
| D457,161 | S | 5/2002 | Groothuis |
| 6,765,664 | B2 * | 7/2004 | Groothuis et al. ........... 356/155 |
| 7,075,635 | B2 | 7/2006 | Groothuis |
| 2003/0133128 | A1 * | 7/2003 | Groothuis et al. ........... 356/601 |

OTHER PUBLICATIONS

Chief Automotive Systems Genesis brochure (6 pages in a 3 page tri-fold format)(Sep. 1996) USA.
Chief Automotive Systems Genesis 2 Measuring System Owner's Manual (38 bound pages plus front, back, inside cover and warranty insert) (May 1999) USA.
Photographs (4 on 1 page) of scanner as shown in Chief Automotive Systems brochure (Jun. 1998).
Chief Automotive Systems Genesis brochure (6pages in a 3-page tri-fold format) (Jun. 1998) USA.

* cited by examiner

*Primary Examiner*—Michael P Stafira
(74) *Attorney, Agent, or Firm*—Spencer Fane Britt & Browne LLP

(57) ABSTRACT

Laser scanners are used for determining deformation in vehicle bodies and the like, using a laser scanning apparatus in conjunction with a plurality of coded targets suspended from (or in known relationship to) known reference points on the vehicle to calculate three dimensional spatial coordinates defining the actual positions of the targets, and to compare such calculated positions with manufacturer-provided specification values. The present invention provides improved signal collection through the use of an independent synchronization circuit that uses a fiber optic cable for signal collection; improved component isolation through the use of a mounting plate and isolation mounts; improved component alignment through the use of easier and more reliable alignment mechanisms; and improved data collection and processing through the use of onboard data averaging and filtering.

4 Claims, 8 Drawing Sheets

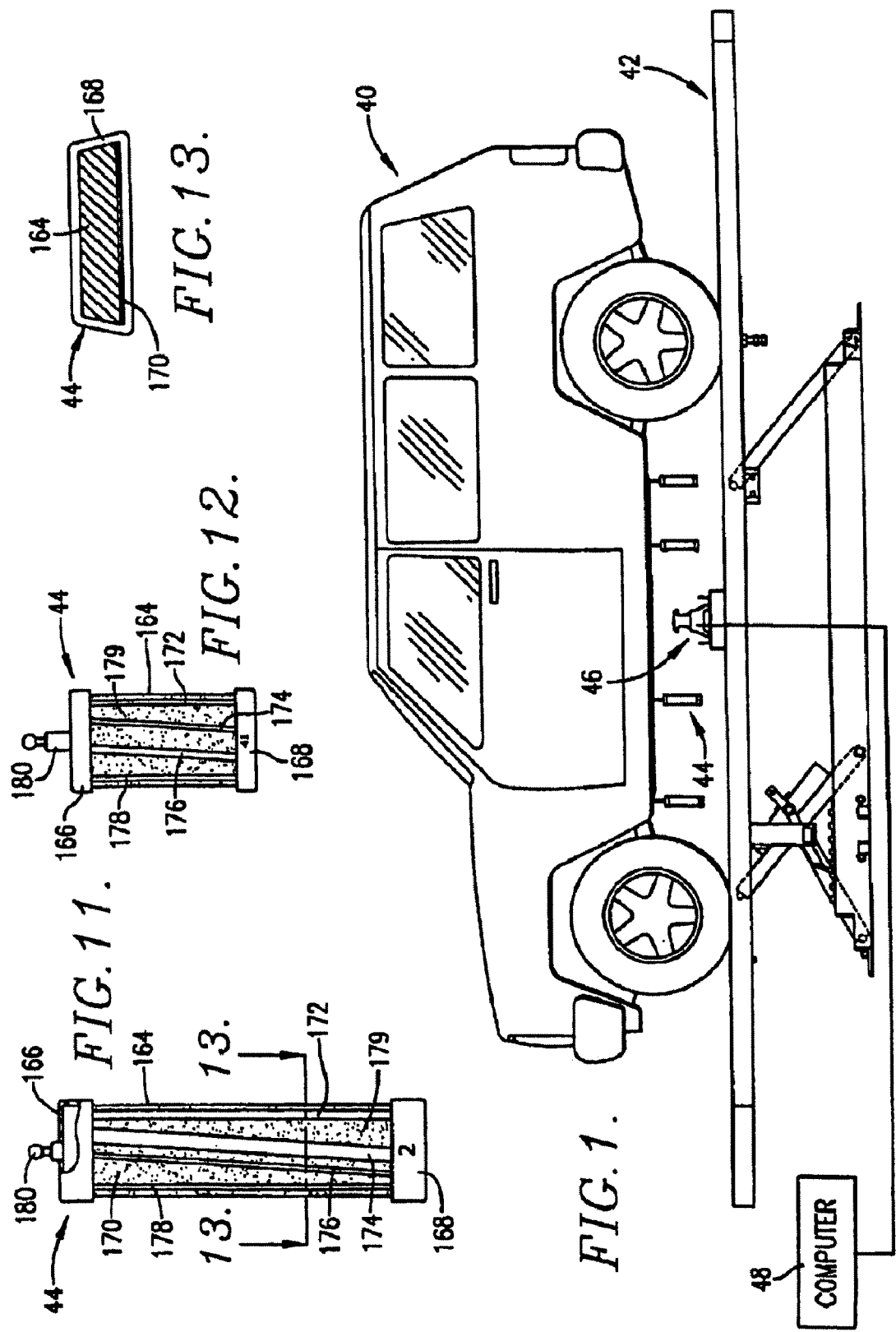

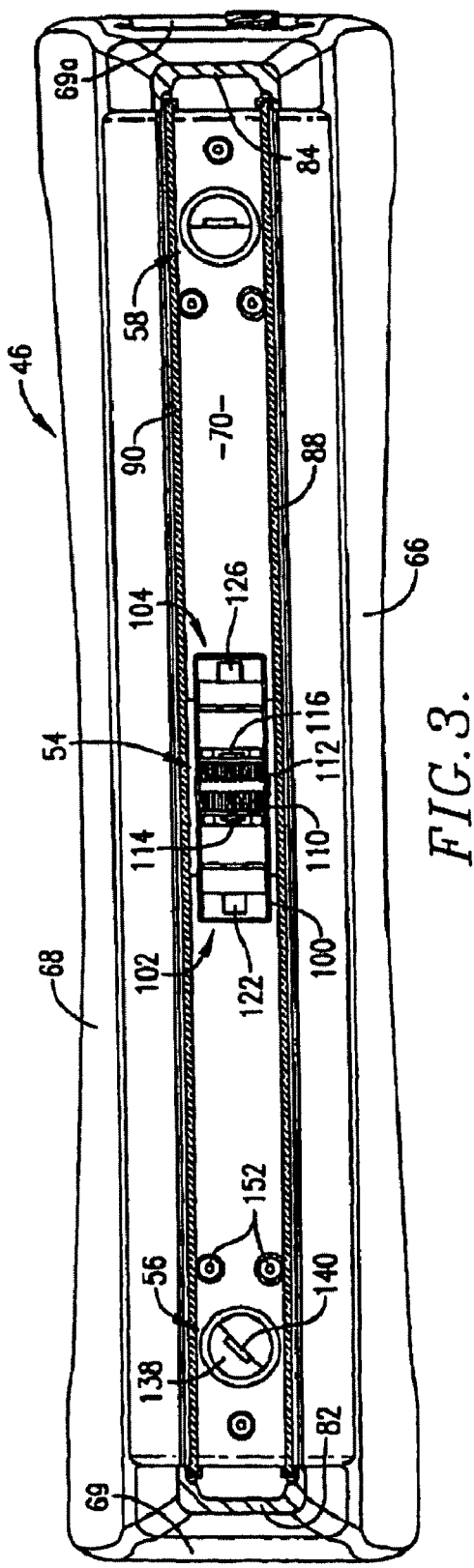

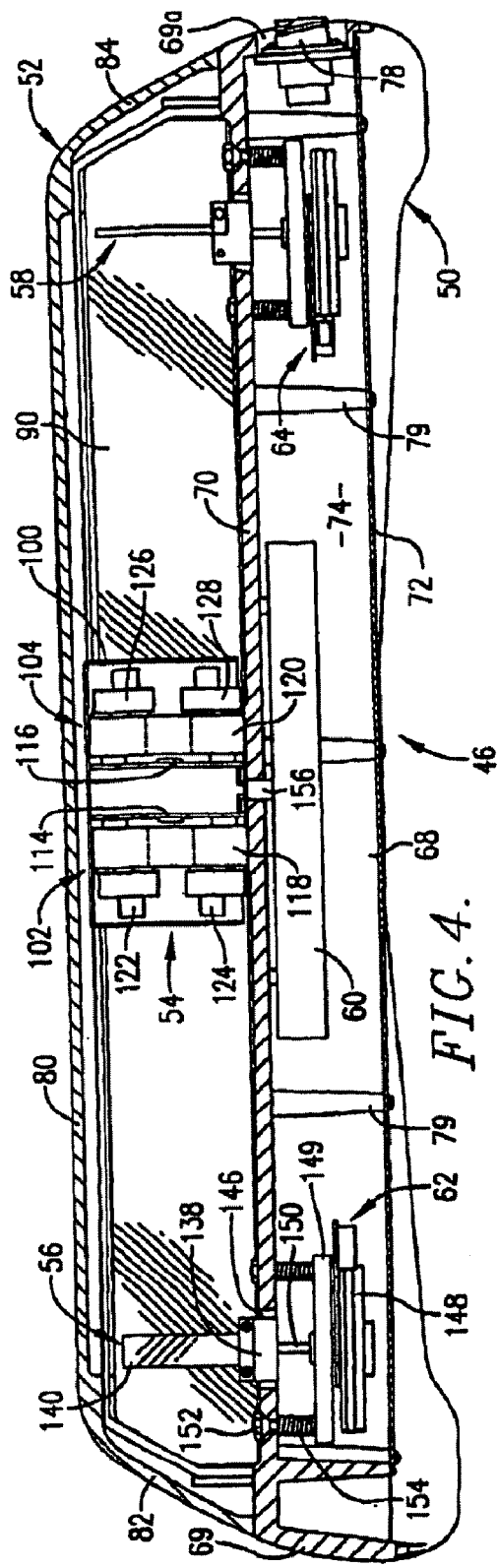

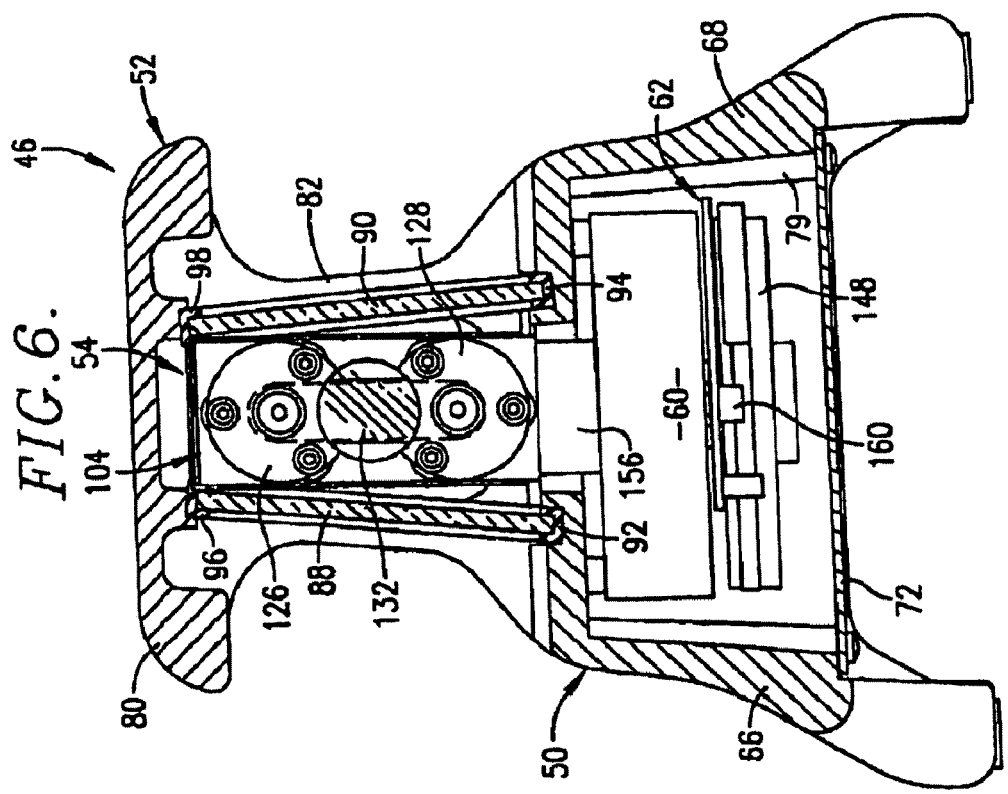
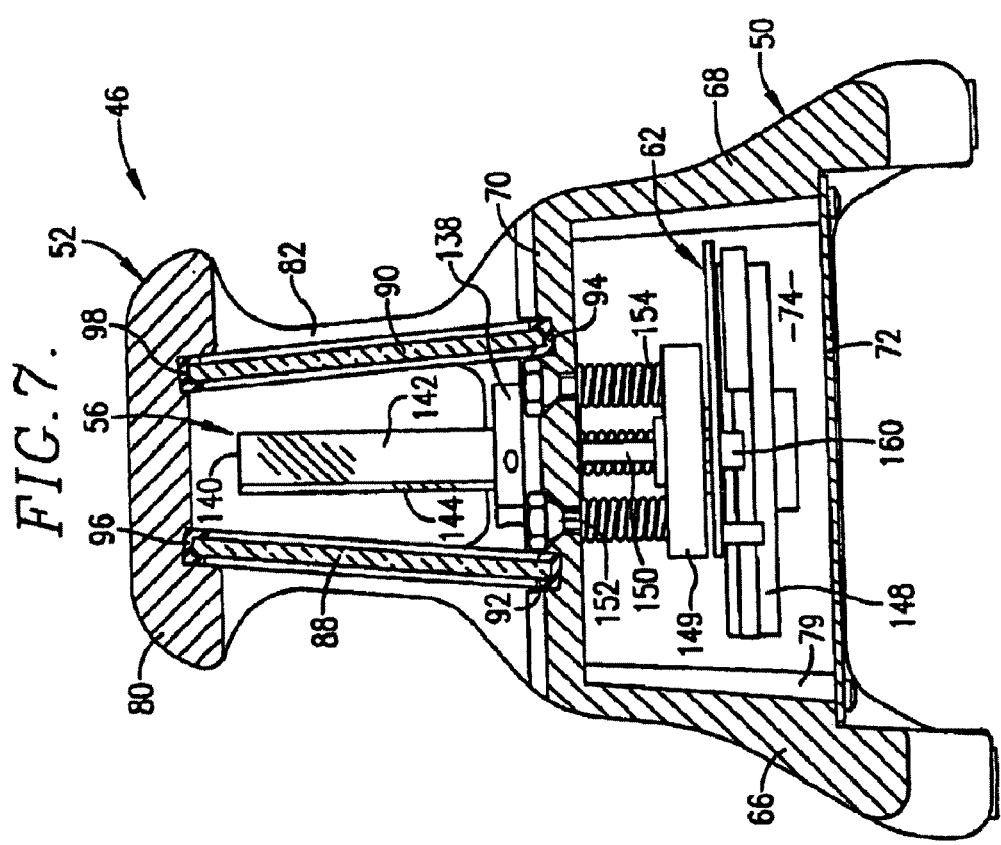

LASER SCANNING APPARATUS WITH IMPROVED OPTICAL FEATURES

RELATED APPLICATIONS

The present U.S. non-provisional patent application claims priority benefit of an earlier-filed co-pending U.S. provisional patent application titled "Laser Scanner with Improved Optical Features", Ser. No. 60/723,731, filed Oct. 5, 2005. The identified provisional patent application is hereby incorporated by reference into the present non-provisional patent application.

BACKGROUND OF THE INVENTION

1. Field of the Invention

The present invention relates to devices and methods for determining deformation in vehicle frames or unibodies and the like, using a laser scanning apparatus in conjunction with a plurality of coded targets suspended from, or in an otherwise known relationship with, known reference points on the vehicle to determine three dimensional spatial coordinates defining the actual positions of the targets, and to compare these determined positions with manufacturer-provided specification values for the reference points.

2. Background of the Invention

Some vehicles, such as automobiles, have a structural frame on which body panels and the like are mounted. Repairing accidental damage to these vehicles often involves straightening their frames and reshaping or replacing body panels. In order to meet government-imposed fuel consumption standards, unibody construction was adopted for many vehicles. In unibody vehicles, no distinct frame exists apart from the body panels; instead, like an egg carton, the panels together form a unitary body, resulting in substantial weight savings.

With either form of vehicle, frame or unibody, quicker and higher quality repairs are made possible by use of frame (and unibody) straightening machines. While such straightening machines are highly effective, they do not by themselves provide information as to the extent of straightening to be accomplished. The vehicles have manufacturer-provided reference points, such as reference openings or holes located at established points on the vehicles. Manufacturers also provide specifications for the correct three-dimensional spatial locations of these reference points relative to each other. If a vehicle is damaged, these reference points may be moved from their normal or "specification" positions relative to each other. Most, if not all, vehicle frame and unibody straightening jobs require that the vehicle reference points be returned to within manufacturer specifications.

A laser scanning apparatus is known having a laser generating unit locatable beneath a vehicle and in an orientation for sweeping laser beams across the reflective surfaces of coded targets suspended from or in known relationship to the aforementioned vehicle reference points. A laser beam is split into two beams using a 50/50 beam splitter, with each beam then being directed to a rotating mirror. The rotating mirrors direct the laser beams in a 360 degree circle, with each pair of split beams being directed in a single plane. Each laser beam is reflected back to its source when it strikes reflective stripes presented by the coded targets. These reflected beams are registered as "on" events (or counts) by electronics onboard a laser measuring device. A counter counts the number of counts (as measured by an oscillator) from zero to the edge of each reflective/non-reflective border on the targets. An associated microprocessor receives the count information for each target and computes the angle from the center of each mirror to the center of each target. With the two angle measurements (one for each mirror and target) and the known baseline between the two mirrors, the planar (X,Y) coordinates of each reference hole are computed using trigonometry. The third coordinate (Z) is calculated using Z-coordinate representative sizing of the reflective and non-reflective strips on the coded targets. The actual three-dimensional spatial coordinates of each reference point relative to a calculated point and plane are determined and displayed by the computer, along with any deviation from the normal or specification value provided by the vehicle manufacturer. With this information, the operator can then straighten the frame or unibody, with successive measurements being taken to monitor the progress of the straightening operation and to determine when the frame or unibody is properly straightened.

Unfortunately, this apparatus suffers from a number of problems and limitations. For example, the apparatus mounts all of the optical components directly on cast support structures. This creates problems for several reasons, including that the castings are not thermally stable, the castings are subject to warping when bolted together, and shock to and vibration of the castings is transmitted directly to the optical components. As a result, the apparatus is susceptible to thermal cycling, misalignment, shock, and vibration, any of which can adversely affect accuracy.

Furthermore, the apparatus uses a method of generating a synchronization ("sync") signal in which an edge of the mirror is used to create a high-intensity sync signal that must ultimately be discerned from low-intensity target reflection signals. This sync signal is critical to the accuracy of the apparatus. Using the same circuitry and optics to detect both the high-intensity sync signal and the low-intensity target reflection signals creates problems due to compromises made in the detection circuitry and optics to handle both types of signals.

Additionally, the apparatus requires mechanical alignment methods for the precision optics in order to compensate for small manufacturing tolerances. The prior art alignment methods can be difficult to perform and unreliable.

Additionally, the apparatus transmits one revolution of data to the associated microprocessor every one to two seconds, depending on the communication rate and the number of targets. However, the mirrors rotate and generate data at approximately six revolutions per second, and so the excess data is discarded and lost.

SUMMARY OF THE INVENTION

The present invention provides an improved laser scanning apparatus for use in conjunction with a plurality of coded targets suspended from, or in an otherwise known relationship to known reference points on a vehicle, to determine three dimensional spatial coordinates defining the actual positions of the targets, and to compare such determined positions with manufacturer-provided specification values in order to identify deformation in the frame or unibody of the vehicle. The present invention provides component isolation using a mounting plate and isolation mounts; signal collection using an independent synchronization circuit that uses a fiber optic cable for signal collection; component alignment using easier and more reliable alignment mechanisms; and data collection and processing using onboard data averaging and filtering. It will be understood that any one or more of these features may be incorporated into substantially any prior art or yet to be invented laser scanning apparatus that may benefit therefrom.

More specifically, the present invention includes mounting the optical components on a mounting plate which is isolated from cast support structures by isolation mounts, and thereby avoids problems arising from mounting the optical components directly on the castings.

Furthermore, the present invention includes providing a second independent synchronization circuit to allow for optimizing each synchronization circuit for a particular type of reflection signal. Also, at least the second synchronization circuit, and possibly both synchronization circuits, is provided with a fiber optic cable for signal collection. The combination of circuit optimization and fiber optic cable avoids problems arising from using the same detection circuitry and optics for both types of signals.

Additionally, the present invention includes reducing the number of major adjustments that may need to be made in order to align the optical components. More specifically, a limited number of strategically placed jack screws, ball joints, and springs, are used to allow for adjusting the lasers and the mirrors, thereby avoiding problems arising from difficult and unreliable alignment methods.

Additionally, the present invention includes synthesizing all available data prior to communicating it to the associated microprocessor, thereby avoiding limitations arising from a relatively slow data communication rate.

These and other novel features of the present invention are described in more detail in the section titled DETAILED DESCRIPTION OF THE INVENTION, below.

BRIEF DESCRIPTION OF THE DRAWINGS

FIG. 1 is a side elevational view of a vehicle having coded reflective targets suspended from predetermined locations on the vehicle, and with a laser scanning apparatus disposed below the vehicle and in an orientation for scanning the depending targets;

FIG. 2 is a front elevational view of a laser scanning apparatus;

FIG. 3 is a sectional view taken along line 3-3 of FIG. 2 and depicting further details of the internal construction of the laser scanning apparatus;

FIG. 4 is a vertical sectional view of the laser scanning apparatus;

FIG. 5 is a bottom view of the laser scanning apparatus, with the bottom cover plate removed;

FIG. 6 is a vertical sectional view taken along line 6-6 of FIG. 2 and depicting components of the laser assembly of the laser scanning apparatus;

FIG. 7 is a vertical sectional view taken along line 7-7 of FIG. 2 and illustrating in detail the construction of the mirror assemblies of the laser scanning apparatus;

FIG. 11 is a side elevational view with parts broken away of a target for use in conjunction with the laser scanning apparatus;

FIG. 12 is a side elevational view of another version of the target;

FIG. 13 is a sectional view taken along line 13-13 of FIG. 11;

DETAILED DESCRIPTION OF THE INVENTION

Figure 9:
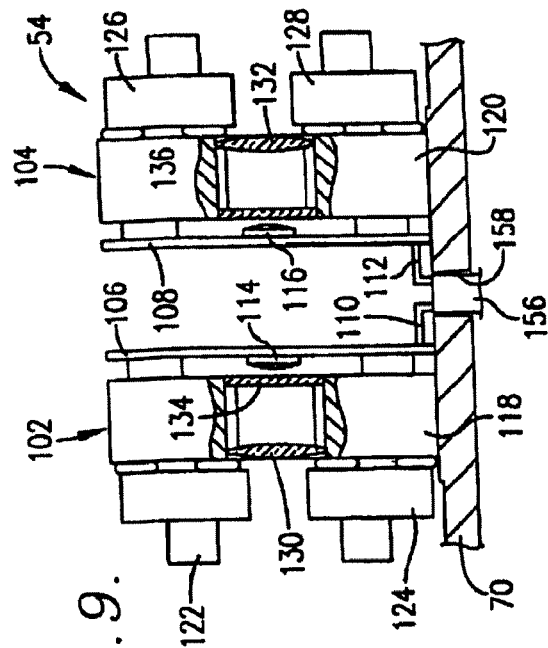
FIG. 9 is an enlarged, fragmentary view with parts broken away and depicting the laser assembly.
Figure 10:
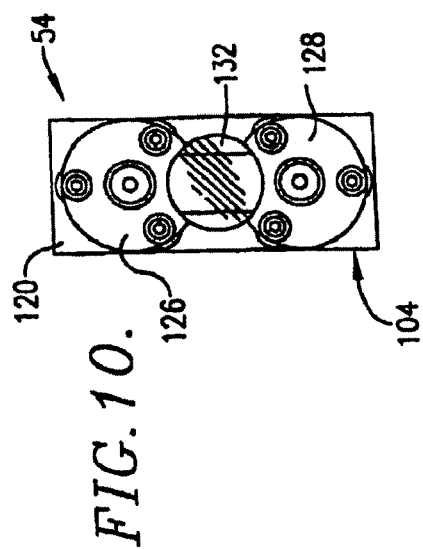
FIG. 10 is a side elevational view of the laser assembly.
Figure 8:
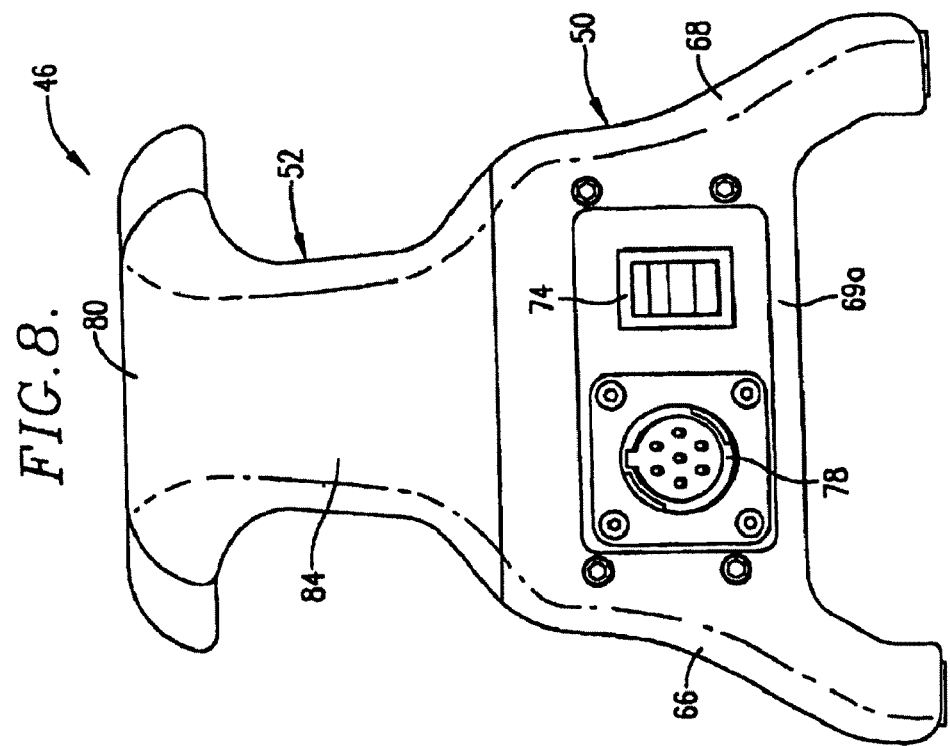
FIG. 8 is an end elevational view of the laser scanning apparatus, showing the on-off switch and computer connection.

With reference to the figures, an improved laser scanning apparatus is herein described, shown, and otherwise disclosed in accordance with a preferred embodiment of the present invention. Broadly, laser scanning apparatuses are used, in conjunction with a plurality of coded targets suspended from, or in an otherwise known relationship to known reference points on a vehicle, to determine three dimensional spatial coordinates defining the actual positions of the targets, and to compare such determined positions with manufacturer-provided specification values in order to identify deformation in the frame or unibody of the vehicle. The present invention provides component isolation using a mounting plate and isolation mounts; signal collection using an independent synchronization circuit that uses a fiber optic cable for signal collection; component alignment using easier and more reliable alignment mechanisms; and data collection and processing using onboard data averaging and filtering. It will be understood that any one or more of these features may be incorporated into substantially any prior art or yet to be invented laser scanning apparatus that may benefit therefrom.

A laser scanning apparatus 46 into which the features of the present invention may be incorporated is shown in FIGS. 1-13 and described below. This apparatus 46 is described in greater detail in U.S. Patent Application Pub. No. 2005/0162665A1, which is hereby incorporated by reference into the present application. Similar apparatuses into which the features of the present invention may be incorporated can also be found in U.S. Pat. Nos. 6,829,046 and 6,765,664, which are also hereby incorporated by reference into the present application. The features of the present invention are shown in FIGS. 14-19 and described following the description of the apparatus 46. The apparatus 46 is described only in order to provide context for the subsequent description of the features of the present invention. Thus, it should be understood that the features of the present invention are not limited to incorporation into the particular apparatus disclosed herein or in the aforementioned published application or issued patents, and may instead, as stated, be incorporated into substantially any prior art or yet to be invented laser scanning apparatus which may benefit from such improvement.

Turning now to the drawings, and particularly FIG. 1, a vehicle 40 is illustrated on a lift device 42. The vehicle 40 has a plurality of individually coded targets broadly referred to by the numeral 44 suspended from specific locations around the vehicle. The laser scanning apparatus 46, having been precalibrated at the manufacturing factory, is located beneath the vehicle 40 and in an orientation for laser scanning of the suspended targets 44. As shown, the apparatus 46 is operatively coupled with a computer 48, typically in the form of a PC.

The apparatus 46 is illustrated in FIGS. 2-10 and broadly includes a lower housing 50; an upper housing 52; a laser assembly 54; a pair of end-mounted mirror assemblies 56,58; a main control board 60; and respective mirror assembly control boards 62,64 (see FIG. 5).

The lower housing 50 is in the form of a metallic boxlike element presenting a front wall 66; opposed rear wall 68; end walls 69,69a; top panel 70; and removable bottom plate 72. An elongated component compartment 74 is thus defined between front and rear walls 66,68, a top panel 70, and a bottom plate 72. It will be observed (FIG. 8) that the end wall 69a is equipped with an on-off switch 76 as well as a pin-type connector 78 allowing for coupling the computer 48 to the apparatus 46. The bottom plate 72 is secured to the lower housing 50 by means of connector struts 79.

Upper housing 52 includes a top wall 80 with oblique, depending end walls 82,84. The upper housing 52 is secured to the lower housing 50 by means of end connectors 86 (FIG. 5). The overall upper housing 52 also includes a pair of upstanding, opposed transparent glass window panels 88,90 which extend substantially the full length of the upper housing between end walls 82,84. Referring to FIGS. 6 and 7, it will be seen that the panels 88,90 are housed within elongated grooves 92,94 provided along the length of the top panel 70, as well as within grooves 96,98 provided along the underside of the top wall 80.

The laser assembly 54 is located within the upper housing 52, and rests atop the panel 70 of the lower housing 50. The laser assembly 54 includes an upright housing cover 100 with a pair of oppositely directed, vertical dual laser units 102,104 therein. Each of the units 102,104 has an upright circuit board 106,108 equipped with electrical connectors 110,112 and a central laser detector 114,116. Additionally, each unit 102, 104 has an upright mounting block 118,120 which is secured by fasteners (not shown) to the top panel 70. A first one of the blocks 118 supports as first pair of vertically spaced apart laser diodes 122,124, and a second one of the blocks 120 supports a second pair of vertically spaced apart laser diodes 126,128. The upper lasers 122,126 are vertically spaced above the lower lasers 124,128 by a known distance, such as, for example, approximately between 20 mm and 40 mm; the upper lasers 122,126 emit radiation in a common upper plane, while the lower lasers 124,128 emit radiation in a common lower plane, where the planes are vertically spaced apart the same known distance. Each of the blocks 118,120 also supports an outboard focusing lens 130,132 and an inboard transparent panel 134,136, such that a first lens 130 and a first panel 134 are located in a covering relationship with the first detector 114, and a second lens 132 and a second panel 136 cover the second detector 116. In one embodiment, the laser diodes emit 250 nm visible laser radiation.

The mirror assemblies 56,58 are mounted within and adjacent respective ends of the upper housing 52. These assemblies are identical and therefore only assembly 56 will be described in detail. Referring to FIGS. 4, 5, and 7, it will be seen that the assembly 56 includes a rotatable hub 138 supporting an upstanding, planar, front reflective-surfaced mirror 140, with the mirror 140 being silvered on one broad face 142, as well as along one narrow, waist-cut beveled edge 144.

The beveled edge 144 produces a secondary narrow mirror used to generate accurate synchronization signals. The edge 144 is formed by grinding a precise waist cut radius and coating the edge so that edge-reflected laser beams are caused to strike back at the midpoint between the upper and lower lasers 122,124, namely at the detector 114. The radius cut is also at a bevel angle that permits the full thickness of the mirror 140 to be centered on the laser beam at the precise angle which will reflect the beam toward the detector 114.

As shown, the hub 138 is mounted within an opening 146 provided in the top panel 70 of the lower housing 50. The hub 138, and thus the mirror 140, are rotated by means of a brushless electric motor 148 and a drive shaft 150 coupled to the hub 138. The hub motor 148 is mounted on a three-point suspension to allow the mirror 140 to be adjusted mechanically to spin at a true vertical axis parallel to the other mirror. While these adjustments can be made mechanically, it can be difficult to obtain an exact alignment. Further, the internal rotating parts of the apparatus 46 are protected by the glass panels 88,90 which may distort the rotational velocity of each hemisphere of scan due to the dissimilar index of refraction between the glass and air. A mathematical correction algorithm is applied by the computer 48 to correct all data for these potential aberrations.

The rotational velocity of the motor 148 is controlled to produce a torque-ripple of less than 10 ppm of rotation speed. The motor 148 and control board 62 (available, for example, as Part No. RM0TN2028GEZZ from Sharp Electronics) are supported beneath top panel 70 by means of a mounting block 149 and three connector bolts 152 extending downwardly from panel 70. Each of the bolts 152 carries a compression spring 154.

The main control board 60 is situated below the laser assembly 54 and is secured to the underside of top panel 70. An electrical connector 156 extends upwardly from board 60 through an opening 158 in the panel 70, for electrical connection with connectors 110,112 associated with the laser units 102,104. The main control board includes appropriate electronics for software control of the laser assembly 54.

Each of the mirror control boards 62,64 includes a Hall-effect sensor 160,162 as well as other conventional electronics, including a magnetically encoded tachometer ring, used in the control of the respective mirror assemblies 56,58. This provides a motor tachometer signal that is amplified to produce a square wave signal. This signal transitions from high to low at one degree increments, providing 360 pulses per revolution of the motor. The speed control signal to the motor is generated by triggering a one-shot pulse of precise duration. The one-shot pulse is implemented digitally, using a system clock running at 29 MHz by dividing the clock down to generate a precise millisecond pulse. The pulse is used to switch a reference voltage into a low-pass filter. The output of the filter rises in voltage when the speed of the motor is too slow, and drops in voltage when the speed of the motor is too fast. In this way, the motor speed is controlled to a precise rpm. A feedback loop is used to stabilize the rotational speeds of the motor at respective, constant speeds. This produces hub rotational velocities which are constant. Although not shown, the main control board 60 and mirror control boards 62,64 are electrically connected by appropriate cabling.

FIGS. 11 and 13 depict a typical coded target 44, which includes an elongated reflective body 164 with opposed end caps 166,168. The body 164 is somewhat trapezoidal in cross-section as best seen in FIG. 13, and has a reflective face 170. In the illustrated target, a total of four upright, elongated mirrored reflective stripes 172,174, 176,178 are provided (sometimes referred to as "strikes"), with non-reflective regions 179 therebetween. It will be observed that certain of the reflective stripes 172,178 are vertically oriented at known slopes and are considered reference stripes, while certain others of the reflective stripes 174,176, the intermediate stripes (or center strikes), are obliquely oriented so that the non-reflective distance between the intermediate stripes and the reference stripes varies throughout the height of the target. An upper hanger element 180 is secured to body 164 and permits suspension of the target 44 from a selected automotive location. FIG. 12 illustrates a target 44 of a different length as compared with that illustrated in FIGS. 11 and 13. However, the target of FIG. 12 likewise includes a body 164; end caps 166,168; hanger element 180; and reflective surfaces 172-178. It will be appreciated that different targets 44 present different patterns of reflective surfaces in order that the scanner 46 may discriminate between individual coded targets, i.e., the strikes of each target have a unique set of strike widths. Moreover, each target has a unique identification number. The targets 44 have the following characteristics: a minimum strike width or 2 mm, with each strike width being at least approximately between 0.5 mm and 1 mm wider than the next narrowest strike width; a minimum non-reflective gap between strikes or 3 mm; a relative overall narrowness so as not to block the view of other targets; and a general configuration for use with a single-line scanner to measure target heights over a range of +/−75 mm.

As delivered from the factory, the apparatus 46 is precalibrated to account and compensate for inevitable manufacturing tolerance errors and the like which may affect, for example, the verticality of the mirrors and the actual rotational speeds of the mirrors.

In use, the scanning apparatus 46 is positioned beneath the vehicle 40 in an orientation such that the radiation emitted by the laser assembly 54 will strike the reflective faces of the coded targets 44 suspended from vehicle reference points. As illustrated in FIG. 1, this is often accomplished by placement of the apparatus 46 beneath the center region of the vehicle on the lift device 42. The computer 48 is coupled with the apparatus 46 as shown.

During scanning operations, the mirrors 140 are rotated at determinable but slightly different speeds while the laser assembly 54 is operated. Specifically, the upper lasers 122, 126 are operated simultaneously and the lower lasers 124,128 are operated simultaneously, but the upper and lower laser pairs are operated alternately owing to the fact that only a single detector 114,116 is used. During operation of the upper laser pair 122,126, a 360 degree scan is generated so that the reflective faces of each of the targets 44 is scanned. The radiation reflected from the targets 44 impinges upon the mirrors 140 and is reflected through the lenses 130,132, which focuses the reflected radiation on the detectors 114, 116. It will be appreciated that each sweep of every target generates eight on-off (reflective/non-reflective) events; the first and last of those events—i.e., the leading or "on" edge of the first reflective reference stripe, and the trailing "off" edge of the last reflective reference stripe—are of special significance in the determination of target position, as will be explained.

Furthermore, as the mirrors 140 rotate, light is reflected not only from the broad mirrored edges 144. The difference between broad face and edge radiation can be detected because of the intensity of light at the detector 114,116; the more intense light denotes edge-reflected radiation, whereas the less intense light denotes broad face-reflected radiation. Hence, as the mirror rotation occurs, at some point for each target the edge radiation will be detected; this is deemed the zero position. The next time edge radiation is detected, it is known that the mirror has traversed 360 degrees. The time between the zero position and the other 360 positions divided by 360 gives the travel time per degree of arc.

Inasmuch as the distance between the mirrors 140 is known, measurement of the angles between each respective target 44 and the mirrors 140 allows calculation of upper X,Y coordinates for each of the targets. Such calculations involve simple triangulation trigonometry, as explained in U.S. Pat. No. 5,801,834, which is incorporated by reference herein. As the upper laser pair scans each target 44, the vertical position of the scan on the target 44 is ascertained by determining the time between reflections from the reference stripes 172,178 and the intermediate, oblique stripes 174,176. For example, and considering FIG. 11, a scan from left to right would generate different non-reflective times depending on the vertical location of the scan. With this information, and knowing the distance between the vertical position of the scan and the tip of the hanger element 180, the upper Z coordinate for each target 44 is calculated.

After the scan by the upper lasers 122,126, the lower lasers 124,128 are operated in the same manner, to achieve a 360 degree scan of the targets 44. Again, the lower lasers 124,128 permit calculation of lower X,Y,Z, coordinates for each of the targets 44. Of course, if the distance between the upper and lower Z coordinates for a given target 44 equals the distance between the upper and lower lasers, that target 44 is deemed to be essentially in plumb.

In practice, the upper and lower X,Y,Z coordinates for each target 44 are averaged and these average X,Y,Z coordinates are used for determining the extent of frame or vehicle straightening required. Also, a vector is generated between the upper and lower X,Y,Z coordinates for each target 44, and the divergence of this vector from vertical can be used to determine the angle of inclination of the target 44.

As previously mentioned, each scanning apparatus 46 is factory precalibrated. Generally speaking, this calibration is carried out using an optical bench having a plurality of targets 44 spaced around the bench at precisely known locations. The apparatus 46 is placed in the middle of the bench, coupled with the computer 48, and operated to scan the targets 44 as described above. This generates a series of apparent target positions using the uncalibrated apparatus. These target locations will typically be in error to a greater or lesser extent, as compared with the known position of the targets, owing to slight manufacturing tolerance errors, e.g., in the position and spacing of the lasers 122,126 and 124,128, or in the orientation of the mirrors 140. Mechanical alignment methods are used to align the precision optics in order to compensate for these manufacturing tolerances.

Optical Component Isolation

In the embodiment described above, the apparatus 46 mounts all of the optical components, including the laser assembly 54 and the mirror assemblies 56,58, directly on the cast support structures of the housing 46, specifically the top panel 70 of the lower housing 50. This creates problems for several reasons, including that the castings are not thermally stable, i.e., the castings expand and contract with changes in temperature; the castings are subject to warping when bolted together; and the castings transmit shock and vibration directly to the optical components. As a result, the apparatus 46 is susceptible to thermal cycling, assembly deformation, shock, and vibration, any of which may adversely affect accuracy.

Figure 14:
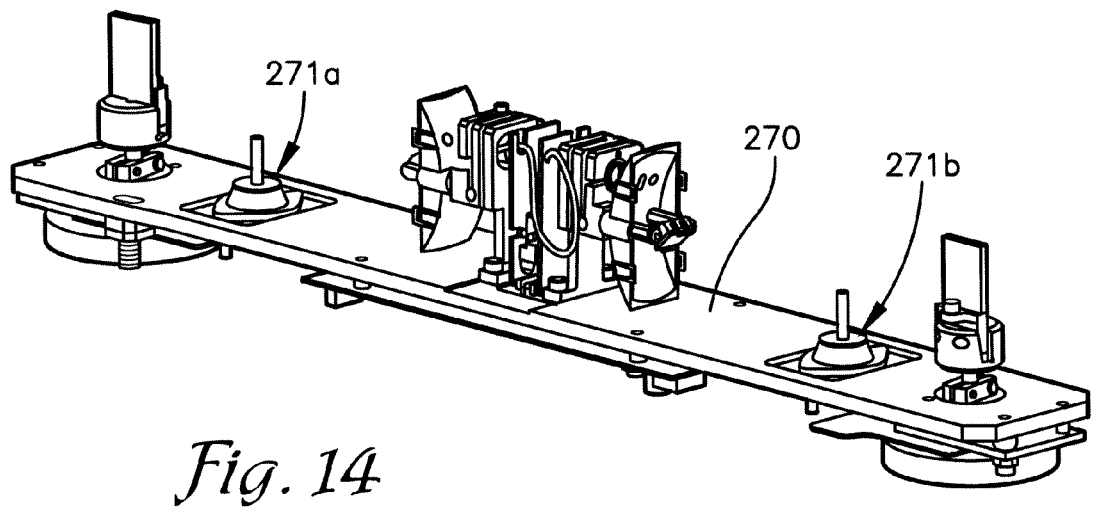
FIG. 14 is an isometric view of an embodiment of a mounting plate and isolation mounts feature of the present invention, shown supporting various optical components of the laser scanning apparatus, including the laser and mirror assemblies.
Figure 15:
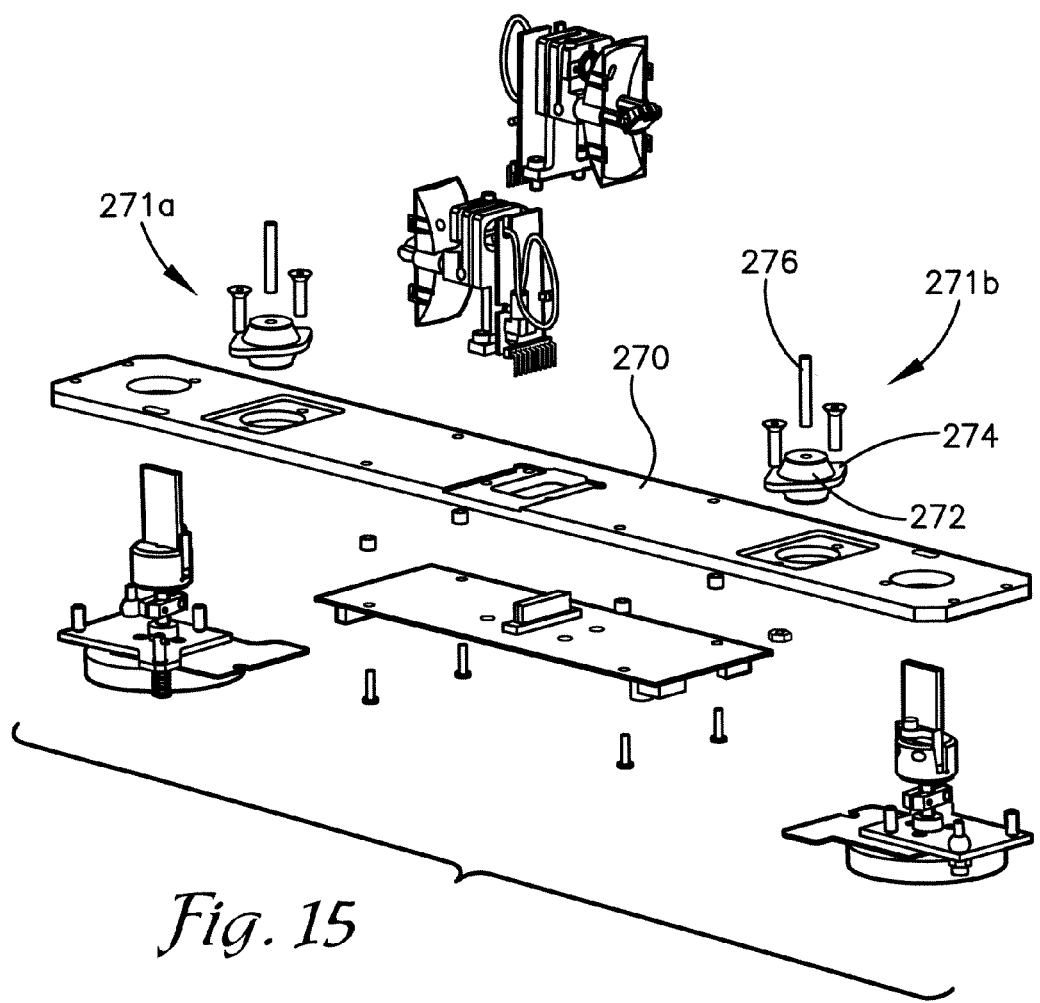
FIG. 15 is an exploded isometric view of the mounting plate and isolation mounts feature.
Figure 16:
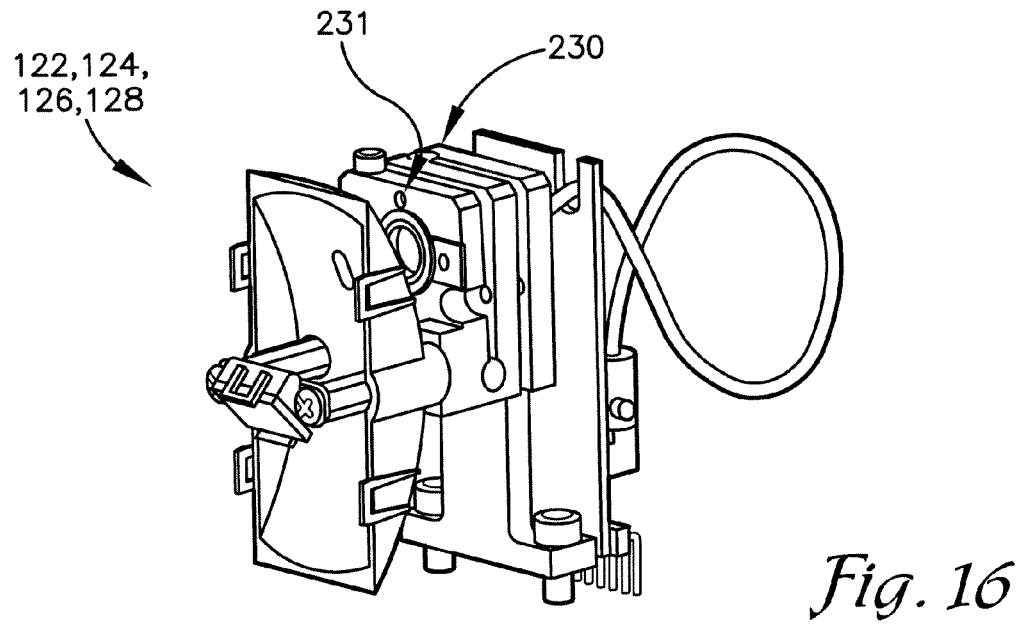
FIG. 16 is an isometric view of an embodiment of a laser assembly alignment mechanism feature of the present invention, shown with various laser assembly components of the laser scanning apparatus.
Figure 17:
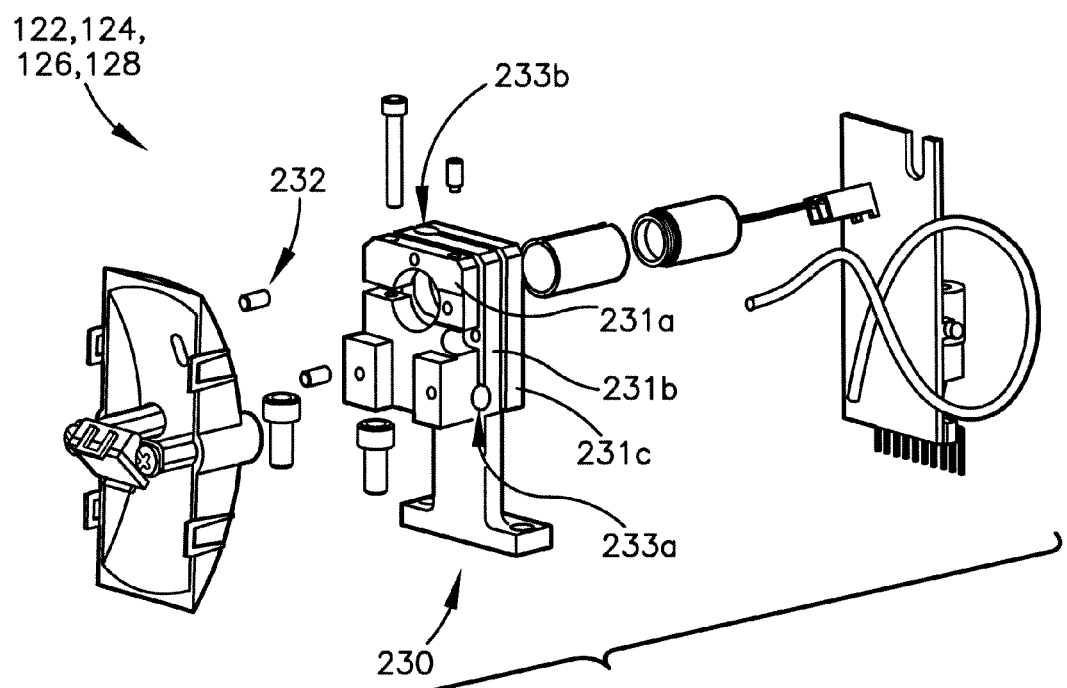
FIG. 17 is an exploded isometric view of the laser assembly alignment mechanism.

As shown in FIGS. 14 and 15, introduction of an isolated mounting plate 270 operationally isolates the sensitive optical components it supports. In one embodiment, the plate 270 is suspended from the top panel 70, or other cast support structure, using isolation mounts 271a,271b. More specifically, for each mount 271a,271b, an isolation member 272, which, in one embodiment, includes elastomer material, floats within an opening in a flange 274 which is bolted or otherwise secured to the plate 270, and a rod 276, or other coupling member, is secured at a first end to the top panel 70 and at a second end to a center area of the isolation member 272. Thus, the flange 274 and the rod 276 are isolated from each other by the isolation member 272. This isolates the plate 270 and the optical components mounted thereon from the cast support structure and thereby ameliorates the deleterious effects of thermal cycling, assembly deformation, shock, and vibration.

It is further contemplated that the plate 270 itself may be constructed of a material or combination of materials operable to minimize the transmission of or correct for the effects of thermal cycling, deformation, shock, or vibration and otherwise provide a degree of isolation in addition to that provided by the isolation mounts 271.

It is further contemplated that multiple smaller mounting plates, rather than a single large mounting plate, may be used to isolate the various optical components.

In another contemplated embodiment, the plate 270 is supported from below by the rod 276, or by a substantially equivalent structure, rather than suspended from above.

Fiber Optic Synchronization Signal Collection

Also in the embodiment described above, the laser scanning apparatus 46 uses a method of generating a sync signal in the form of a relatively high intensity reflection using an edge of the mirror 140 which must be discerned from the relatively low intensity reflection created by the broader face of the mirror 140. This higher intensity reflection is used as the sync signal and enhances the accuracy of the apparatus 46. However, using the same circuitry and optics to detect both the higher intensity reflection and the lower intensity reflection creates a limitation due to compromises made in the optics and detection circuitry to handle both types of reflection signals, and this limitation may affect the accuracy of the apparatus 46 due to a poor signal-to-noise ratio and contamination by external light sources.

Introduction of a second independent synchronization circuit to each circuit board 106,108 allows for optimizing each synchronization circuit for a particular type of reflection signal. Furthermore, at least the second synchronization circuit, and, in one contemplated embodiment, both synchronization circuits, is provided with a fiber optic cable for signal collection. The combination of circuit optimization and fiber optic cable provides highly repeatable signals with a good signal-to-noise ratio and immunity to external light sources.

Optical Alignment Method

Also in the embodiment described above, the laser scanning apparatus 46 requires mechanical alignment methods using threaded members surrounded by springs for aligning the precision optics or the laser and mirror assemblies in order to compensate for small manufacturing tolerances. These alignment methods can be difficult to perform and unreliable, and lack long-term stability.

Reducing the number of major adjustments that may be made to each of the mirrors 56,58 and lasers 122,124,126,128 ameliorates the difficulty and unreliability of these alignment methods. In this feature, referring to FIGS. 16 and 17, each laser 122,124,126,128 (shown with a parabolic collector which is associated with the detectors and which is disclosed in U.S. Pat. No. 6,765,664) is clamped in a tower 230 comprising multiple spaced-apart layers 231a,231b,231c, the spacing of which can be adjusted using jack screws 232 to adjust the direction of the laser beam. More specifically, a first layer 231a is spaced apart from and coupled by a first hinge portion 233a with a second layer 231b along a first axis, and the second layer 231b is spaced apart from and coupled by a second hinge portion 233b with a third layer 231c along a second axis which is substantially perpendicular to the first axis. The various set screws 232 are used to increase and decrease the spacing of adjacent layers opposite the respective hinge portion and thereby increase and decrease the angle between the adjacent layers, which accomplishes a change in the direction of the laser beam.

When a pair of lasers is used, as is the case in the apparatus 46 described above, multiple towers may be used or a single tower adapted to support multiple lasers may be used.

Figures 18, 19:
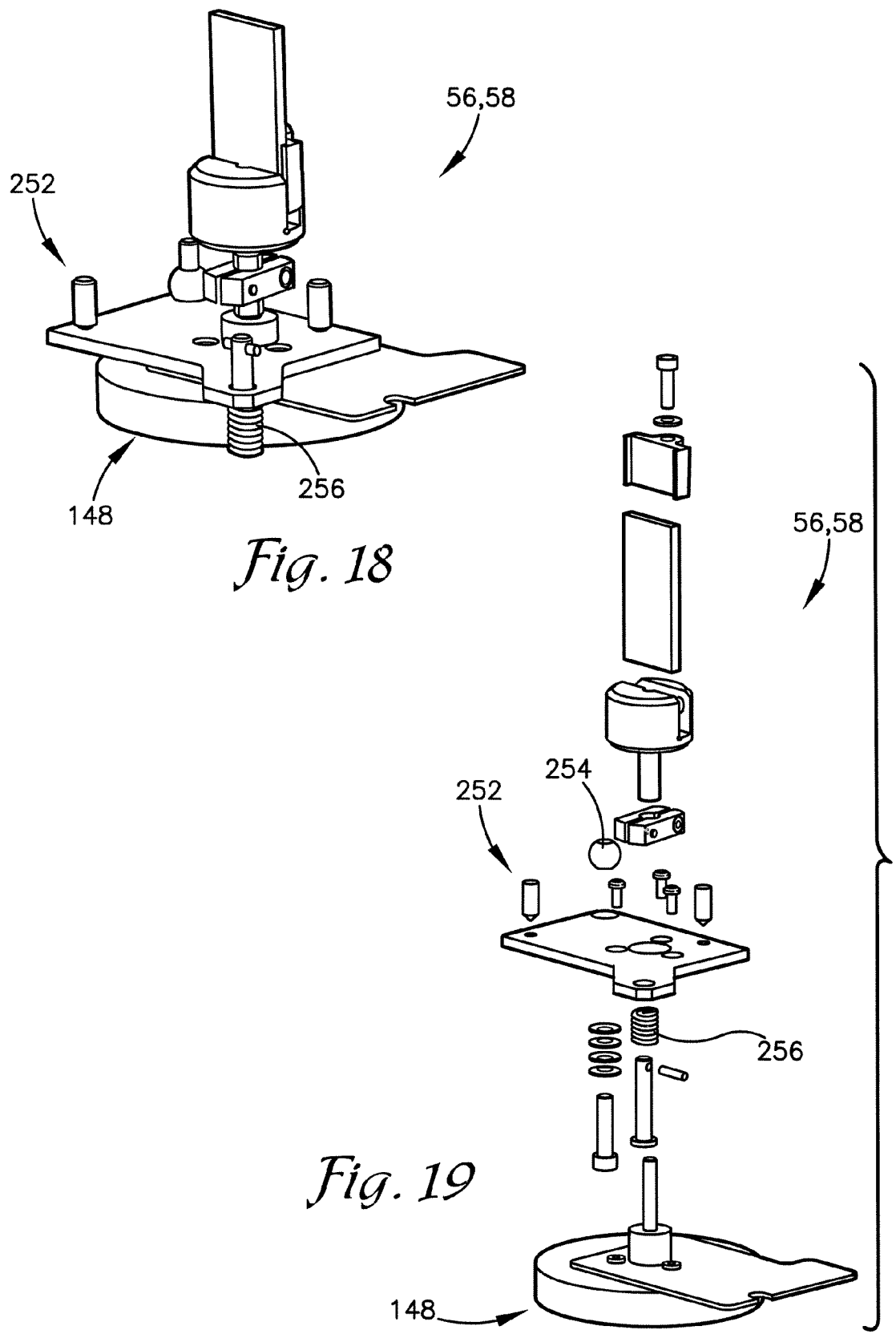
FIG. 18 is an isometric view of an embodiment of a mirror assembly alignment mechanism feature of the present invention, shown with various mirror assembly components of the laser scanning apparatus.
FIG. 19 is an exploded isometric view of the mirror assembly alignment mechanism.

Similarly, referring to FIGS. 18 and 19, each motor 148 is coupled with the isolated mounting plate 270, discussed above, or base plate 70 if the mounting plate improvement is not incorporated, and can be adjusted using jack screws 252 to adjust the orientation of the mirrors. Each motor 148 pivots on a ball joint 254 and is held in place by a compression spring 256. Adjustment of the jack screws 252 causes the motor 148 to pivot on the ball joint 254, thereby changing the orientation of the motor 148 and associated mirror.

Onboard Averaging

Also in the embodiment described above, the apparatus 46 transmits one revolution of data to the computer 48 every one to two seconds, depending on the communication rate and the number of targets 44. However, the motors 148 rotate and produce data at approximately six revolutions per second, and so the excess data is discarded and lost.

Averaging, or otherwise synthesizing, and filtering the data prior to communicating it to the computer 48 overcomes this limitation. This processing of the data can be performed, for example, on the main control board 60 if modified appropriately, or on a separate board specifically designed for the task. As a result, rather than discarding the excess data, it can be used to generate higher precision measurements at longer distances while advantageously maintaining the current communication protocol and rate.

Although the invention has been described with reference to the embodiment illustrated in the attached drawing figures, it is noted that equivalents may be employed and substitutions made herein without departing from the scope of the invention as recited in the claims.

Having thus described the preferred embodiment of the invention what is claimed as new and desired to be protected by Letters Patent includes the following:

1. A laser scanning apparatus for determining frame or unibody alignment of a vehicle to which at least one reflective laser beam target has been mounted, with each reflective laser beam target being located in a known relationship relative to a selected vehicle reference point, the laser scanner apparatus comprising:

a laser operable to produce a laser beam;

a mirror operable to reflect the laser beam toward the at least one reflective target; and at least one mounting plate on which the laser, mirror, and detector are mounted, with the at least one mounting plate being adapted to operationally isolate the laser, mirror, and detector from a structure to which the at least one mounting plate is mounted, wherein the at least one mounting plate is mounted to the structure using at least one isolation mount including a flange having an opening, with the flange being secured to the at least one mounting plate;

an isolation member located within the opening in the flange; and a coupling member having a first end and a second end, with the first end being secured to the structure and the second end being secured to a center portion of the isolation member.

2. The laser scanning apparatus as set forth in claim 1, wherein the isolation member includes an elastomer material.

3. A laser scanning apparatus for determining frame or unibody alignment of a vehicle to which at least one reflective laser beam target has been mounted, with each reflective laser beam target being located in a known relationship relative to a selected vehicle reference point, the laser scanning apparatus comprising:

a laser operable to produce a laser beam;

a mirror operable to reflect the laser beam reflected by the at least one reflective target;

at least one mounting plate on which the laser, mirror, and detector are mounted; and at least one isolation mount adapted to operationally isolate the at least one mounting plate from a cast support structure, the at least one isolation mount including a flange having an opening, with the flange being secured to the at least one mounting plate;

an isolation member located within the opening in the flange; and a suspension member having a first end and a second end, with the first end being secured to the cast support structure and the second end being secured to a center portion of the isolation member so as to suspend the at least one mounting plate from the cast support structure.

4. The laser scanning apparatus as set forth in claim 3, wherein the isolation member includes an elastomer material.

* * * * *

UNITED STATES PATENT AND TRADEMARK OFFICE
CERTIFICATE OF CORRECTION

PATENT NO. : 7,570,352 B2  Page 1 of 1
APPLICATION NO. : 11/381002
DATED : August 4, 2009
INVENTOR(S) : William Clay Flannigan and James Brett Campbell It is certified that error appears in the above-identified patent and that said Letters Patent is hereby corrected as shown below:

In Claim 1, column 10, line 54 "a minor" should be changed to -- a mirror --.

Signed and Sealed this

Sixth Day of October, 2009

David J. Kappos
*Director of the United States Patent and Trademark Office*